United States Patent [19]

Chassagneux et al.

[11] Patent Number: 5,043,045
[45] Date of Patent: Aug. 27, 1991

[54] CERAMIC FIBERS HAVING IMPROVED SURFACE PROPERTIES/RUPTURE STRENGTH

[75] Inventors: Evelyne Chassagneux, Millery; Olivier Caix, Lyons, both of France

[73] Assignee: Rhone-Poulenc Chimie, Courbevoie, France

[21] Appl. No.: 349,823

[22] Filed: May 10, 1989

[30] Foreign Application Priority Data

May 10, 1988 [FR] France ................... 88 06270

[51] Int. Cl.$^5$ ............... B44C 1/22; C03C 15/00; C03C 25/06
[52] U.S. Cl. ...................... 156/663; 65/31; 156/646; 156/657; 252/79.3; 501/35; 501/95; 427/309
[58] Field of Search ............ 156/646, 657, 663; 252/79.3; 65/2, 30.1, 31; 134/3; 427/309; 501/35, 88, 95, 96

[56] References Cited

U.S. PATENT DOCUMENTS 2,261,148 11/1941 Ebaugh ..................... 427/309
3,640,693 2/1972 Galasso et al. ................. 65/2

Primary Examiner—William A. Powell
Attorney, Agent, or Firm—Burns, Doane, Swecker & Mathis

[57] ABSTRACT

Ceramic fibers based on silicon carbide, silicon nitride or silicon carbonitride are treated with hydrofluoric acid, e.g., with a 3% to 30% aqueous solution of HF, to strip surface impurities therefrom, to reduce critical surface defects and to enhance the rupture strength thereof.

10 Claims, No Drawings

CERAMIC FIBERS HAVING IMPROVED SURFACE PROPERTIES/RUPTURE STRENGTH

BACKGROUND OF THE INVENTION

1. Field of the Invention

The present invention relates to the treatment of ceramic fibers, and, more especially, to the treatment of ceramic fibers based on silicon nitride, silicon carbide or silicon carbonitride to enhance the surface properties thereof.

2. Description of the Prior Art

It is known to this art to prepare SiC or $Si_3N_4$ ceramic fibers, or mixtures thereof, in particular from organometallic polymer precursors of such ceramic compounds.

These polymer precursors, as more fully set forth hereinbelow, are well known products which may be in the form of monomers, oligomers, cyclic or linear polymers, and also resinous polymers; they may be prepared by a wide variety of processes utilizing a wide range of starting materials.

According to a conventional process, these polymers (optionally after melting, if originally they are in the solid state) are processed into continuous filaments by any known means, in particular by extrusion through dies, and are then pyrolyzed (after an optional crosslinking to increase their high temperature strength) to yield the desired ceramic fiber final products.

It has been found, however, that the ceramic fibers based on SiC and/or $Si_3N_4$ produced by this method may in certain instances have insufficient surface qualities. This may translate into an appreciable change in the overall performance of the fibers. By "surface quality", as utilized herein, is particularly intended the potential presence, on the one hand, of different chemical impurities, such as, for example, silica, and, on the other, of critical defects, which adversely affect the overall performance of the fibers in respect of certain mechanical properties, such as, for example, rupture or breaking strength.

SUMMARY OF THE INVENTION

Accordingly, a major object of the present invention is the provision of a treatment for substantially improving the surface and/or mechanical properties of ceramic fibers based on silicon carbide, silicon nitride or silicon carbonitride.

Briefly, the present invention features contacting such ceramic fibers with hydrofluoric acid, HF.

DETAILED DESCRIPTION OF THE PREFERRED EMBODIMENTS OF THE INVENTION

More particularly according to the present invention, it had now unexpectedly and surprisingly been determined that the acid treatment consistent herewith makes it possible to simultaneously attain the following results:

(i) initially, the elimination of surface impurities, in particular surface oxide layers, such as, for example, silica;

(ii) also, the substantial elimination of critical surface defects originally present on the fiber; and (iii) finally, a significant improvement in the rupture strength of the fiber.

The ceramic fiber subjected to the treatment according to the invention is typically a fiber based on silicon carbide, silicon nitride or silicon carbonitride. It has nevertheless also been found that the treatment according to the invention is more generically applicable to any ceramic fibers of a third category, namely, those based on silicon, carbon and nitrogen.

These fibers may be single filament, or multifilament, i.e., they may comprise a plurality of monofilaments, whether or not intertwined.

The fibers based on SiC and/or $Si_3N_4$ treated according to the invention are preferably produced from the aforesaid organometallic polymer precursors, but it will be appreciated that the treatment of fibers produced by any other means is also within the scope of this invention.

Exemplary of the organometallic polymer precursors suitable for the preparation of the starting material ceramic fibers are the polysilanes, polycarbosilanes, polycarbodisilanes, polysilazanes and poly(disilyl)silazanes.

The organometallic polymers belonging to the first three categories of precursors are particularly suitable for the preparation of SiC fibers.

The basic processes for the synthesis of such organometallic polymer precursors and their conversion into fibrous forms thereof are described, for example, in published French applications FR-2,308,590, FR-2,308,650, FR-2,327,836 and FR-2,345,477. FR-A-2,487,364, FR-A-2,487,366, EP-A-51,855, EP-A-123,162, EP-A-123,934, EP-A-184,123 and U.S. Pat. No. 4,414,403 describe a variety of embodiments and variants for carrying out the general processes illustrated in the '590, '650, '836 and '477 published French applications.

The organometallic polymers of the polysilazane and poly(disilyl)silazane type are more particularly suitable for the preparation of $Si_3N_4$ or mixed $Si_3N_4$/SiC fibers.

The basic processes for producing these latter organometallic polymer precursors and their conversion into fibrous form are described in published French applications FR-2,190,764 and FR-2,197,829. Different embodiments and variants relative to both the synthesis of such polymers and their conversion into the form of fibers are described in FR-A-1,086,932, U.S. Pat. Nos. 2,564,674, 3,853,567 and 3,892,583, BE-A-888,787, GB-A-881,178, FR-A-1,379,243, FR-A-1,392,853, FR-A-1,393,728, EP-A-75,828, FR-A-2,497,812, JP-A-77/160,446, U.S. Pat. Nos. 3,007,886 and 3,187,030 and FR-A-2,577,933.

According to this invention, after the desired ceramic fiber has been produced in the above manner, it is next contacted with hydrofluoric acid, HF.

The hydrofluoric acid is preferably employed in the form of a liquid solution, but the use of gaseous hydrofluoric acid is also within the scope of the invention.

Furthermore, the liquid solution is preferably an aqueous solution.

The proportion of the dilution, or concentration of the HF acid in said solution advantageously ranges from 3% to 30% by volume and preferably is around 10% by volume.

The duration of the treatment may vary over wide limits, i.e., within a period of time ranging from several minutes to several hours, preferably from 5 min. to 5 hours. However, treatment periods ranging from 5 to 60 min are generally sufficient to obtain the desired result.

Finally, the temperature at which the treatment is carried out may range from ambient temperature to 100.C. Preferably, it ranges from 20° to 30° C. and even more preferably is around 25° C.

Generally, the three interdependent parameters, i.e., concentration, time and temperature, are regulated in consideration of the fact that an overly strong or lengthy treatment (excessive HF concentration and/or temperature too high), may damage the fiber by modifying its core properties (reduction in density, appearance of pitting corrosion, modification of morphology, etc.).

In actual practice, the treatment according to the invention is discontinued when a perfectly smooth and clean surface is observed.

The fibers treated according to the invention have important applications as reinforcing materials in composites having a glass, metal or ceramic matrix. It is known to this art that the properties of the fiber/matrix interface in such materials are highly important.

In order to further illustrate the present invention and the advantages thereof, the following specific example is given, it being understood that same is intended only as illustrative and in nowise limitative.

EXAMPLE

Preparation of silicon carbonitride monofilament

A polymer of the polysilazane type was initially prepared by rigorously following the procedure described in Example 18 of FR-A-2,577,933 assigned to the assignee hereof, i.e., by polymerizing, in the presence of triflic acid, a coammonolysate obtained by the ammonolysis in a solvent medium of a mixture of methyltrichlorosilane and dimethyldichlorosilane in a molar ratio of 67/33.

The resulting polysilazane was then melted, extruded in the form of fibers and then rendered infusible.

The fibers were then pyrolyzed under an inert atmosphere (nitrogen or argon) at a temperature of from 1,000° to 1500° C.

The properties of the fibers obtained were the following:

$\phi = 12.6 \pm 0.8$ $\mu$m (diameter)
$\sigma_R = 1,000 \pm 300$ MPa (rupture strength)
$E = 130$ Gpa (Young's modulus)
$Ra = 0.8$ $\mu$m (mean size of critical defect)
$m = 3.5$ (Weibull modulus)

This fiber had a surface layer of silica, $SiO_2$, characterized by ESCA.

Notes

The Ra was measured by scanning electron microscope examination of rupture faces, m is a parameter indicative of the stress distribution at rupture of a material; the greater the dispersion, the smaller is m.

Acid treatment according to the invention

This fiber was then treated at 25° C. and for 30 min with a 10% by volume aqueous solution of hydrofluoric acid.

After this treatment, the properties of the fiber were the following:

$\phi = 11.5 \pm 0.8$ $\mu$m
$\sigma_R = 1,430 \pm 260$ MPa
$E = 130$ GPa
$Ra = 0.6$ $\mu$m
$m = 5.7$ It was observed that the surface of the fiber was perfectly smooth and no $SiO_2$ existed on its surface (ESCA analysis).

Also, scanning electron microscope examination evidenced the existence of two types of defects prior to the HF treatment of the fiber, but only one type thereafter.

These results clearly show that the HF treatment of the invention improves the surface characteristics and the rupture strength of a ceramic fiber by reducing the mean size of the critical defect Ra.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for enhancing the surface characteristics and rupture strength of a ceramic fiber based on silicon nitride, silicon carbide or silicon carbonitride, comprising treating such ceramic fiber with an effective surface/rupture strength modifying amount of hydrofluoric acid.

2. The process as defined by claim 1, said hydrofluoric acid comprising a liquid solution thereof.

3. The process as defined by claim 2, said hydrofluoric acid comprising an aqueous solution thereof.

4. The process as defined by claim 3, said hydrofluoric acid comprising a 3% to 30% by volume aqueous solution thereof.

5. The process as defined by claim 1, carried out for from 5 min to 5 hours.

6. The process as defined by claim 1, carried out at a temperature ranging from ambient to 100° C.

7. The process as defined by claim 6, carried out at a temperature ranging from 20 to 30° C.

8. The process as defined by claim 1, comprising treating a silicon carbide ceramic fiber.

9. The process as defined in claim 1, comprising treating a silicon nitride ceramic fiber.

10. The process as defined in claim 1, comprising treating a silicon carbonitride ceramic fiber.

* * * * *